United States Patent
Johnson

[11] Patent Number: 5,865,923
[45] Date of Patent: Feb. 2, 1999

[54] METHOD OF FABRICATING A DUAL CHAMBER COMPOSITE PRESSURE VESSEL

[75] Inventor: Terence C. Johnson, Salt Lake City, Utah

[73] Assignee: EDO Corporation, Fiber Science Division, Salt Lake City, Utah

[21] Appl. No.: 903,946

[22] Filed: Jul. 31, 1997

Related U.S. Application Data

[63] Continuation of Ser. No. 622,931, Mar. 27, 1996, abandoned, which is a continuation of Ser. No. 283,576, Aug. 1, 1994, abandoned, which is a division of Ser. No. 102,578, Aug. 5, 1993, Pat. No. 5,383,566.

[51] Int. Cl.$^6$ .......................... B65H 81/00; B65D 90/06; B65D 25/04
[52] U.S. Cl. .......................... 156/172; 156/173; 156/175; 220/414; 220/588; 220/589; 220/590
[58] Field of Search .................................. 156/172, 173, 156/175; 220/414, 590, 588, 589

[56] References Cited

U.S. PATENT DOCUMENTS

| | | | |
|---|---|---|---|
| 2,092,490 | 9/1937 | Zerbe . | |
| 2,962,182 | 11/1960 | Rossheim . | |
| 3,012,922 | 12/1961 | Wiltshire . | |
| 3,094,071 | 6/1963 | Beckman . | |
| 3,228,549 | 1/1966 | Courtney | 220/589 |
| 3,251,500 | 5/1966 | Archbold . | |
| 3,260,398 | 7/1966 | Levenetz | 220/590 |
| 3,383,002 | 5/1968 | Fleming et al. . | |
| 3,394,738 | 7/1968 | Baron et al. | 220/414 X |
| 3,615,999 | 10/1971 | Saudemont et al. | 156/172 |
| 4,123,307 | 10/1978 | Lemelson | 156/172 |
| 4,453,995 | 6/1984 | Morrisey | 156/172 |
| 4,561,568 | 12/1985 | Hoffmeister et al. . | |
| 4,778,073 | 10/1988 | Ehs . | |
| 4,783,232 | 11/1988 | Carbone et al. | 156/172 |
| 5,018,634 | 5/1991 | Le Touche . | |
| 5,025,943 | 6/1991 | Forsmann . | |
| 5,085,343 | 2/1992 | Scarr . | |

FOREIGN PATENT DOCUMENTS

| | | | |
|---|---|---|---|
| 468746 | 7/1914 | France . | |
| 2 681 840 | 10/1991 | France . | |
| 2039980 | 8/1980 | United Kingdom | 220/414 |
| 9209507 | 6/1992 | WIPO | 220/414 |

*Primary Examiner*—Jeff H. Aftergut
*Attorney, Agent, or Firm*—Thorpe, North & Western, L.L.P.

[57] ABSTRACT

A dual-chamber composite pressure vessel includes a first enclosure formed of a fiber reinforced resin matrix, having a hollow cylindrical central section, and first and second oblate end sections formed integrally over respective ends of the central section to define a first chamber. Also included is a second enclosure formed of a fiber-reinforced resin matrix, integrally with the first enclosure, and having a second hollow cylindrical section which is joined at one end to and extends from the second end section co-cylindrically with the central section of the first enclosure. The second enclosure also includes a third oblate end section formed integrally over the other end of the second cylindrical section to define a second chamber.

6 Claims, 2 Drawing Sheets

METHOD OF FABRICATING A DUAL CHAMBER COMPOSITE PRESSURE VESSEL

This application is a continuation of U.S. application Ser. No. 08/622,931, filed Mar. 27, 1996, now abandoned, which is a continuation of U.S. application Ser. No. 08/283,576 filed Aug. 1, 1994, now abandoned, which is a divisional of U.S. application Ser. No. 08/102,578 filed Aug. 5, 1993, now U.S. Pat. No. 5,383,566, of Terrence C. Johnson for DUAL CHAMBER COMPOSITE PRESSURE VESSEL AND METHOD OF FABRICATION THEREOF.

BACKGROUND OF THE INVENTION

This invention relates to fiber wound composite pressure vessels with integrally formed dual chambers, and a method of fabricating same.

Composite (fiber reinforced resin matrix) containers or vessels have come into common use for storage of a variety of fluids under pressure, including storage of oxygen, natural gas, nitrogen, rocket fuel, propane, etc. Such composite construction provides numerous advantages such as lightness in weight and resistance to corrosion, fatigue and catastrophic failure. This combination of lightness in weight and resistance to failure is possible due to the high specific strength of the reinforcing fibers or filaments (carbon, glass, aramide, etc.) which, in the construction of pressure vessels, is typically oriented in the direction of the principal forces.

One prospective use of composite vessels is as air brake reservoirs for railroad freight cars. Such freight cars currently use cast iron or steel two-chamber pressure containers, but these containers are quite heavy, and difficult to install and maintain. Also, iron and steel corrode so that currently used containers must be coated on the inside to prevent corrosion (caused by condensation in the air pressure system) and this, of course, further increases the cost. Of course, if a way could be found to utilize composite vessels for such air brake reservoirs, then the problems of the heavy weight and corrosiveness would be solved.

Because railroad freight car air brake reservoirs must contain two chambers, and must also be able to withstand high internal pressures, the most obvious approach to utilizing composite vessels for the air brake reservoirs would simply be to utilize a pair of cylindrical composite tanks having domed end sections, with the tanks being joined end to end. However, this arrangement would result in unused dead space between the two tanks which would simply take up space if installed for use in a railroad freight car.

SUMMARY OF THE INVENTION

It is an object of the invention to provide a dual-chamber composite vessel which is compact and exhibits high structural integrity.

It is also an object of the invention to provide such a dual-chamber vessel which is especially suitable for use as a railroad freight car air brake reservoir.

It is a further object of the invention to provide such a vessel which is lightweight and requires no anti-corrosive coatings when used in an otherwise corrosive environment.

The above and other objects of the invention are realized in a specific illustrative embodiment of a fiber-wound composite pressure vessel which includes a first chamber-defining enclosure having a first oblate end section, a first cylindrical sidewall formed integrally at one end with the end section, and a second oblate end section formed integrally with the sidewall at the other end thereof to enclose and define the first chamber.

One embodiment includes a second chamber-defining enclosure having a second cylindrical sidewall which is formed integrally with the first sidewall to extend forwardly of the second end section to a termination, and having a third oblate end section formed integrally with the second sidewall over the termination thereof to enclose and define a second chamber. With this construction, a rugged, lightweight, non-corrosive, and compact dual-chamber pressure vessel is provided.

Advantageously, the dual-chamber pressure vessel described above is constructed so that the first and second end sections and first sidewall are comprised of a first layer of helically wound fiber, the second end section is comprised of additional wound fibers for further structural reinforcement, and the first and second cylindrical sidewalls, and first and third end sections are comprised of a layer of hoop and helically wound fiber.

A second embodiment includes a second chamber-defining enclosure having a second cylindrical sidewall which is formed integrally with oppositely disposed third and fourth end sections. The fourth end section is oblate, hemispherical or dome-shaped, with an exterior surface which is convex. The third end section is also oblate, hemispherical or dome-shaped, with an exterior surface which is concave, the curvature being complementary to the curvature of the second end section, to enable fitting thereover. The two enclosures are joined together by laminating a composite material to the concave surface of the third end section and to the exterior surface of the second end section to join the enclosures end to end. The first and second cylindrical sidewalls and the first and fourth end sections are overwrapped with hoop and helical fibers to form one contiguous outer surface for the dual chamber pressure vessel, and to anchor the composite material separating the two chambers or enclosures.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
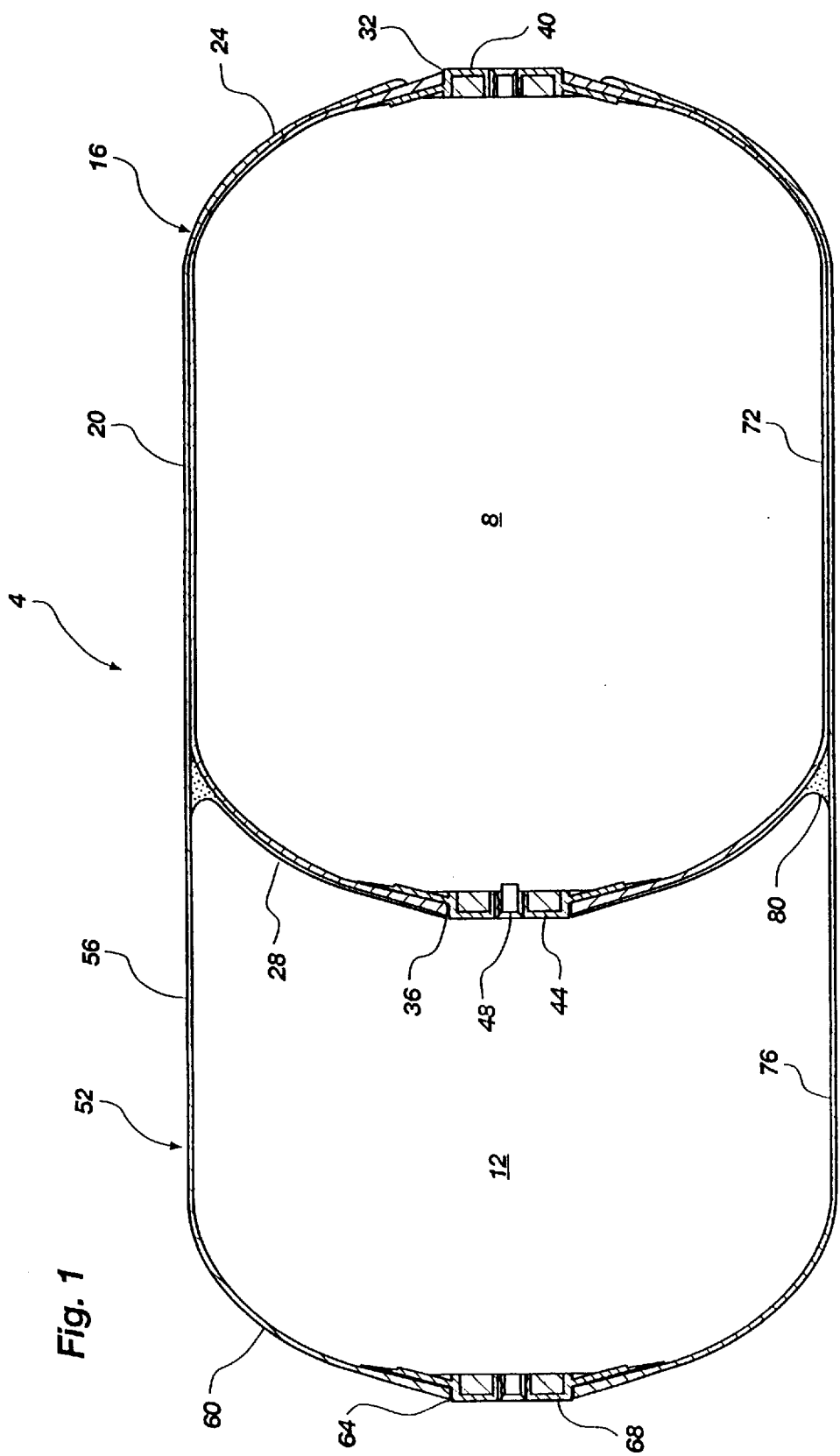
FIG. 1 shows a side, cross-sectional view of one embodiment of a dual-chamber composite pressure vessel made in accordance with the principles of the present invention.

Referring to FIG. 1, there is shown a composite dual-chamber vessel 4 made in accordance with the present invention. The vessel 4 is formed to include a pair of chambers 8 and 12, with chamber 8 being defined by an enclosure 16 having a hollow cylindrical central section sidewall 20, an oblate, hemispherical- or dome-shaped end section 24 formed integrally over one end of the central section 20, and another oblate, dome-shaped end section 28 formed integrally over the other end of the central section. As will be described more fully later, the central section 20, end section 24, and end section 28 are all formed of a fiber-wound composite material. Note that the end sections 24 and 28, and especially the end section 28, are reinforced with additional fibers to be thicker to withstand pressures to which the enclosure 16 might be subjected. End section 28, especially, is reinforced to serve as an interior bulkhead between the two chambers 8 and 12.

The end sections 24 and 28 include axially-aligned openings 32 and 36 in which are disposed conventional access bosses 40 and 44 respectively. The access boss 44 is shown with a plug 48 to close off access into and out of the chamber 8.

A second enclosure 52 is formed over one end of the enclosure 16 to define the chamber 12. Enclosure 52 includes a hollow cylindrical section sidewall 56 attached at one end over the end section 28 of enclosure 16 as shown. The enclosure 52 also includes a dome-shaped end section 60 formed over the other end of the cylindrical section 56. An opening 64, axially aligned with openings 32 and 36 of enclosure 16, is formed in the end section 60, and an access boss 68 is disposed in the opening 64. As with the enclosure 16, the enclosure 52 is formed of a fiber-wound composite material integrally with the material of enclosure 16.

The vessel described above provides the desired dual-chamber configuration which is lightweight, sturdy and compact, with no attendant wasted dead space.

An exemplary fabrication method for the dual-chamber tank shown in FIG. 1 involves mounting on a winding machine a plastic liner 72 having the desired shape of the enclosure 16. This would be done using conventional fiber-winding techniques such as, for example, mounting an inflated liner 72 on the winding machine or positioning the liner about a removable mandrel which is then mounted on the winding machine. Next, a layer of helically wound fibers or filaments is formed over the liner 72 to initially define the shape of the enclosure 16 and the chamber 8. Additional fibers or filaments are wound over the dome of the enclosure 16 which form the end section 28, to provide reinforcement for what will serve as the interior pressure bulkhead. This winding, advantageously, would also be helical. A second liner 76 formed with a cylindrical sidewall and dome at one end is bonded, using a suitable bonding agent 80 such as epoxy adhesive, over the end section 28 so that the sidewalls of the liner 76 are co-cylindrical with the central section 20 sidewalls, as shown in FIG. 1. The liner 76, and liner 72 with the existing helically wound layer of composite material, is then again mounted on a winding machine in a conventional fashion and the entire exterior surface of the tank is wound with helical and hoop fibers to yield the dual-chamber configuration shown in FIG. 1. Although other fabrication methods could be used to arrive at the construction shown in the drawing, the method described above is especially suitable for providing the desired sturdy construction in a relatively fast and efficient manner.

The material of the plastic liners 72 and 76 might illustratively be high density polyethylene, and the composite material used to form the layers over the liners could be any conventional composite material, such as carbon, glass, aramide, etc.13 reinforced resin matrix.

Figure 2:
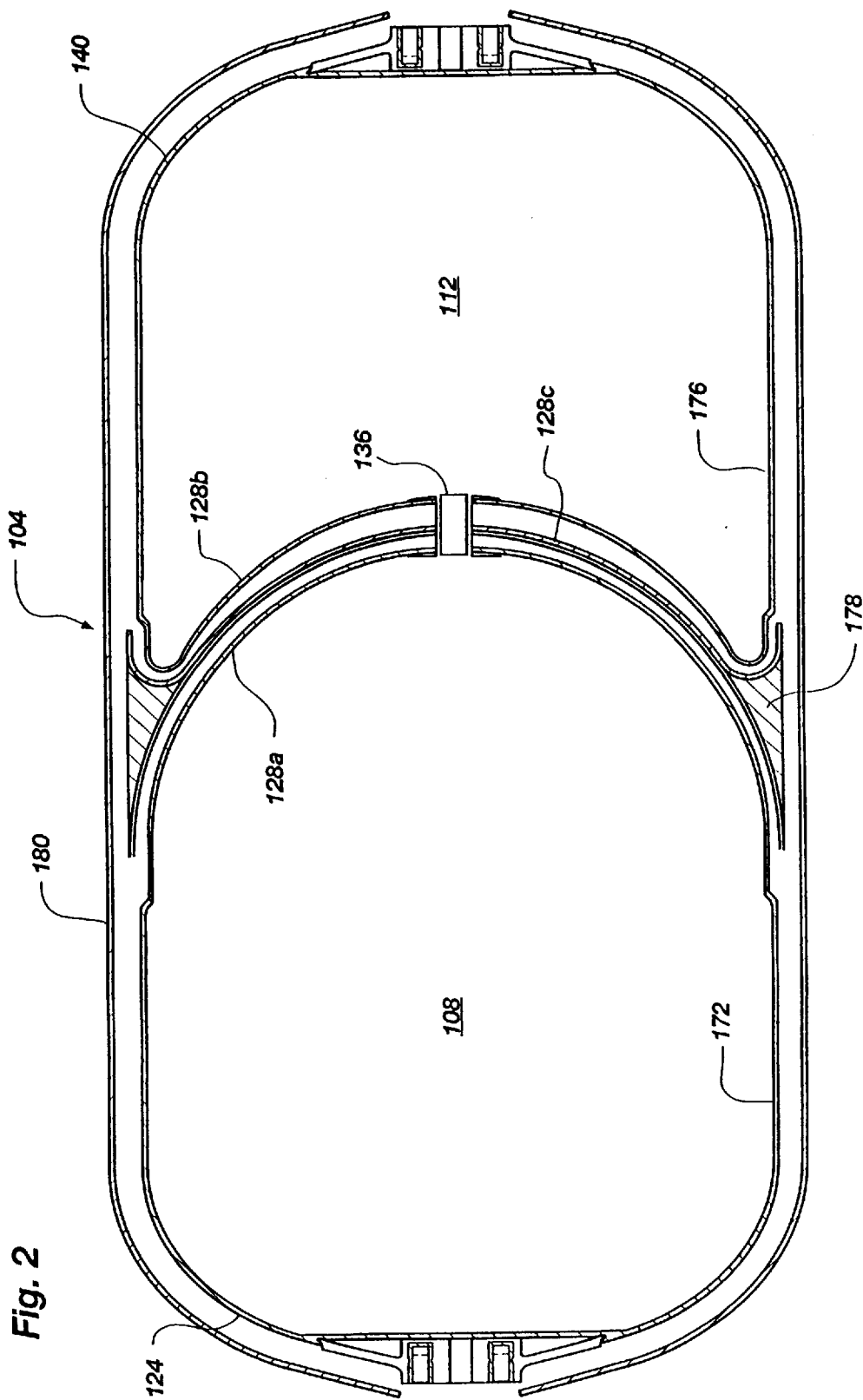
FIG. 2 shows a side, cross-sectional view of another embodiment of a dual-chamber composite pressure vessel made in accordance with the present invention.

FIG. 2 shows another embodiment of a dual-chamber pressure vessel 104 in accordance with the present invention. In this pressure vessel, two plastic (high density polyethylene, nylon, etc.) liners 172 and 176 are formed to define two compartments 108 and 112, including oblate, hemispherical or dome-shaped end sections 124 and 128a of liner 172, a concave end section 128b and an oblate, hemispherical or dome-shaped end section 140 of liner 176. The concave end section 128b is shaped to be complementary to the convex exterior surface of end section 128a.

A composite material (fiber-reinforced resin matrix) 128C is laminated to the exterior of end sections 128a and 128b and the end sections are then pressed towards one another.

The joined liners 172 and 176 are then mounted onto winding shafts and pressurized to about 5 psi, the pressure in the liners thereby imparting a compressive force to the laminated composite 128c between the end sections 128a and 128b of the liners. This force drives out the air and excess composite material, such as resin, resulting in a high quality, durable "joining" laminate 128c. The joined liners 172 and 176 are overwrapped, first by hoop and helical winding of fibers over the entire exterior surface of the liners, to form a contiguous outer sidewall 180. The overwrapping of the fibers also covers the end sections 124 and 140 to form one contiguous outer wall for the dual chamber composite pressure vessel 104.

The FIG. 2 embodiment also provides the desired lightweight, sturdy and compact dual-chamber composite pressure vessel.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of fabricating a dual-chamber pressure vessel comprising the steps of:
   (a) forming a first layer of filament-wound composite material over an inflated plastic liner/mandrel to define a first chamber, said layer having a central cylindrical section, and opposing, convex first and second end sections,
   (b) reinforcing the second end section with an additional composite layer,
   (c) forming an opening in the first end section and the second end section and wherein the openings are in axial alignment,
   (d) bonding a second plastic liner/mandrel to the second end section to define a second chamber,
   said second liner/mandrel having
      a hollow cylindrical section, one end of which is bonded to the second end section to be co-cylindrical with the central cylindrical section of the first layer, and
      a convex third end section formed integrally with the hollow cylindrical section over the other end thereof, and
   (e) forming a second layer of filament-wound composite material over the central cylindrical section and first end section of the first layer, and over the second liner/mandrel, so as to form a second enclosure integrally formed with the first enclosure.

2. The method of claim 1 wherein step (a) comprises winding the first layer with helical filaments.

3. The method of claim 2 wherein step (d) comprises winding the second layer with helical and hoop filaments.

4. The method of claim 3 wherein the first, second and third end sections are generally dome-shaped.

5. The method according to claim 1 wherein the method further comprises forming an opening in the third end section and positioning the opening in axial alignment with the openings in the second and the first end sections.

6. The method of claim 1 wherein the method comprises more specifically forming the second and the third end sections from a single winding and forming the first end section from a double winding.

* * * * *